July 18, 1933.  H. T. SEELEY  1,919,077
PROTECTIVE SYSTEM
Filed Aug. 18, 1930
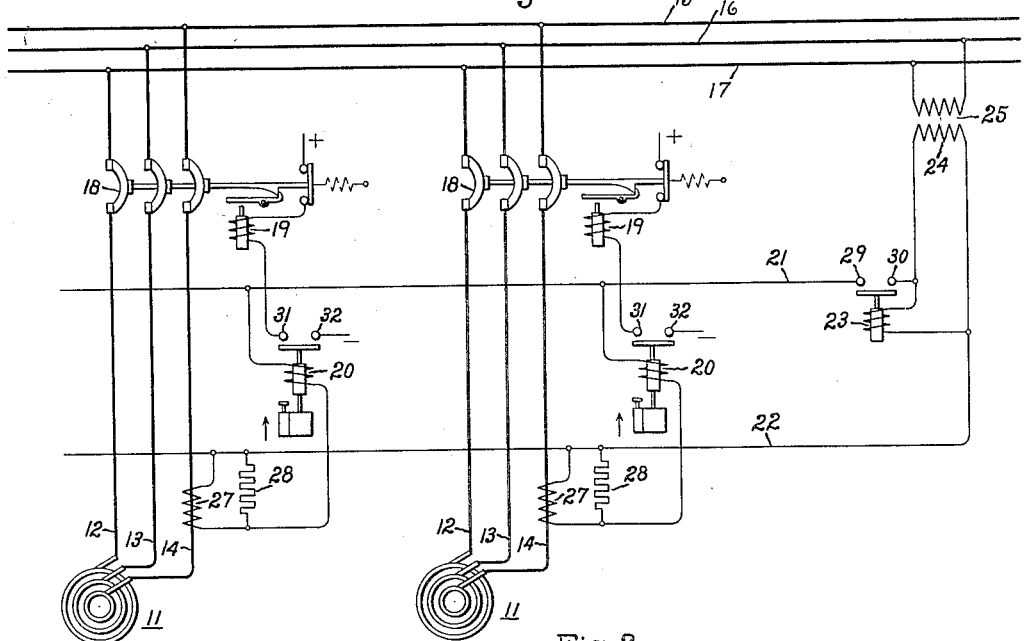
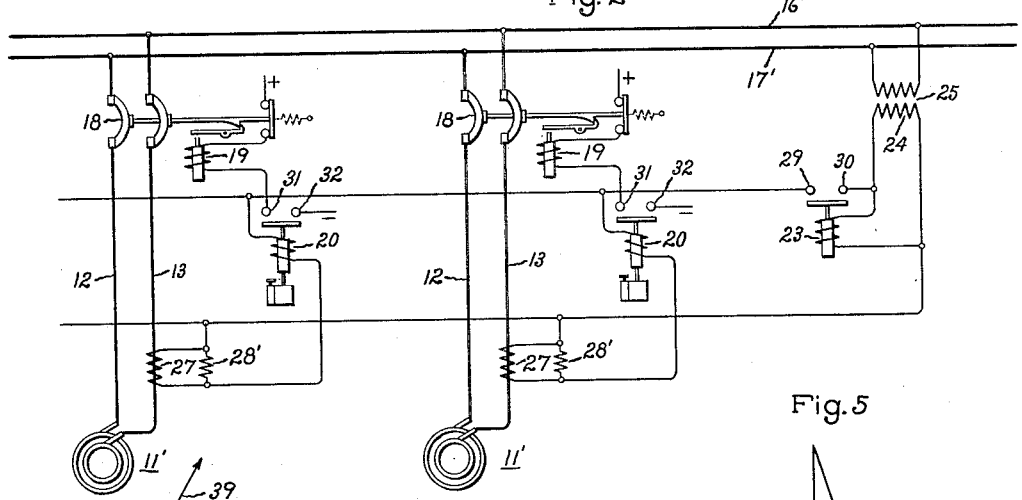
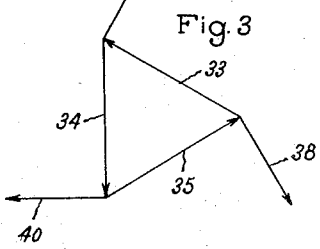
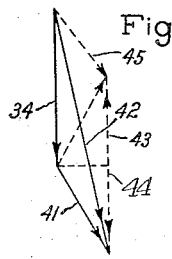
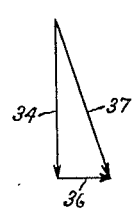
Inventor:
Harold T. Seeley,
by Charles E. Mullan
His Attorney.

Patented July 18, 1933

1,919,077

UNITED STATES PATENT OFFICE

HAROLD T. SEELEY, OF YEADON, PENNSYLVANIA, ASSIGNOR TO GENERAL ELECTRIC COMPANY, A CORPORATION OF NEW YORK

PROTECTIVE SYSTEM

Application filed August 18, 1930. Serial No. 475,321.

My invention relates to improvements in protective systems and particularly the selective overvoltage protection of translating devices such as alternating current generators connected in parallel where it is desired to disconnect only the particular generator responsible for the overvoltage condition in the system. On existing alternating current distribution systems with a single unit hydro-electric station there is usually an overvoltage relay for the generator which will disconnect it from the system in case of an overvoltage which sometimes is an indication of voltage regulator failure. In multiple unit stations, however, the overvoltage relays for the generators are all subjected to the same overvoltage of the system in case of failure of any particular voltage regulator. With a condition of this character it is very probable that other generators will be disconnected from the system instead of the particular generator in which there was an overvoltage failure.

One object of my invention is to obviate this difficulty and provide improved and simple apparatus whereby the generator in connection with which there is voltage regulator failure may be selectively removed from the system to relieve the overvoltage condition. Thus the generator responsible for the overvoltage condition will be the first one to be removed from the system.

My invention will be better understood from the following description when considered in connection with the accompanying drawing and its scope will be pointed out in the appended claims.

In the accompanying drawing, Fig. 1 illustrates diagrammatically an electric system embodying my invention. Fig. 2 illustrates diagrammatically a modification of my invention and Figs. 3, 4 and 5 are vector diagrams explanatory of my invention.

In carrying my invention into effect I provide an overvoltage relay for controlling each generator. This relay is dependent on the combined effect of two conditions in the system. The first effect is the apparent voltage of the generator which is the voltage across the terminals of the generator or the voltage of the system while the second effect is the condition of the current delivered by the generator. This latter condition is determined by the operation of two or more generators in parallel. In the explanation which follows it will be assumed that the load on the system is unity power factor.

For the satisfactory operation of alternating current generators in parallel the generated voltage of each generator must be the same. When the excitation of any one particular generator increases, due to voltage regulator failure or other causes, its generated voltage increases. If the system voltage is $E_1$ and the generated voltage of a particular generator increases to $E_2$, a voltage difference $E_2 - E_1$ is produced. This sets up a wattless or reactive circulating current between or among the generators connected to the system. In the faulty generator, this wattless current is lagging and produces a demagnetizing effect or decreases the effective excitation of this generator until its terminal voltage equals the apparent voltage of the system.

If the generated voltage of the other generators is $E_3$ and the system voltage is $E_1$, the increase in voltage of the faulty generator to $E_2$ will cause a voltage difference $E_1 - E_3$ between the voltage of the system and the generated voltage of each of the other generators. The circulating current will be opposite in phase and leading in each of these generators to increase their effective excitation and thus to bring the terminal voltage of each generator up to the value of the apparent voltage of the system. The current in the generator whose excitation is increased is therefore lagging while the current in the other generators is leading since the first generator is supplying magnetizing current to the other generators.

The above explanation is based on a unity power factor load on the system. When there is a lagging load on the system and the excitation of one particular generator increases, the same result will be obtained with the exception that there is a relative phase displacement of the currents in the generators with respect to the lagging load current since the wattless current in each generator is superimposed upon the current of the external load circuit.

The overvoltage relay of any particular generator will operate when the generated voltage of that generator reaches a predetermined maximum, as determined by the combination of these two conditions, to disconnect the generator from the system.

Referring to Fig. 1 of the drawing, a plurality of polyphase generators 11 are connected in parallel by phase conductors 12, 13, 14 to a common polyphase bus or load distributing circuit 15, 16, 17 to which the electrical energy is delivered. For controlling the circuits of the generators, I provide suitable circuit interrupting means such as a circuit breaker 18 having a trip coil 19 which is to be controlled by the protective apparatus embodying my invention. Other generators may be similarly connected but for simplicity only two are shown in the drawing.

Associated with each generator 11 is an overvoltage relay 20 whose operation is dependent on the effect of the above mentioned two conditions of the system for controlling the circuit interrupting means 18. The relays 20 preferably have an inverse time limit characteristic for increased selectivity.

The first condition, that is, the voltage of the system is impressed on secondary buses 21 and 22 by means of a potential transformer 25 and through contacts 29 and 30 of a primary overvoltage relay 23, which is energized directly from the secondary 24 of transformer 25. This relay may be instantaneous circuit closing on overvoltage and is preferably instantaneous circuit opening on the return of normal voltage. The energizing of the coil of the overvoltage relay 20 is thus dependent on the operation of the overvoltage relay 23 which is responsive to the apparent voltage of the generator or the voltage of the system.

The current transformer 27 with its associated resistor 28 connected in parallel with its secondary comprise means which is responsive to the second condition of the system, that is, the phase relation of the current delivered by the over-excited generator. The primary of the current transformer 27 is connected in series with the phase conductor 14 which connects with the bus conductor 15 while the voltage of the system is measured across the bus conductors 16 and 17 by the potential transformer 25. The coil of the overvoltage relay 20 is connected across the buses 21 and 22 and in series with the resistor 28, and hence is energized in accordance with the resultant voltage in this circuit. The connections of the current transformer 27 are so made in conductor 14 that the resultant voltage will be the sum of the voltages in the circuit above mentioned.

The theory of operation will be better understood in connection with the vector diagrams shown in Figs. 3, 4, and 5. Referring to Fig. 3 there is shown a vector diagram with 33, 34 and 35 representing the line to line voltage vectors of a three phase circuit. The vector 34 represents the bus voltage applied to the coil of overvoltage relay 20, since it is measured across the bus conductors 16 and 17. When the power factor of the load of any particular generator is unity the currents in each phase of the generator will be in phase with the voltage. The current in the resistor 28 is taken from the phase conductor 14 and is equivalent to the vectorial difference between the currents in phase conductors 12 and 13. This current leads the bus voltage 34 by 90 degrees. The voltage vector diagram at unity power factor load for the generator is shown in Fig. 5 with 34 representing the bus voltage, 36 the voltage drop in the resistor, and 37 the resultant voltage applied to the coil of the overvoltage relay 20. With a lagging load on the generator the currents are represented by the vectors 38, 39 and 40 as shown in Fig. 3. The current taken from the phase conductor 14 with this condition would again be the vectorial difference between the currents in the phase conductors 12 and 13. The voltage vector diagram with a load of lagging power factor is shown in Fig. 4, 34 being the bus voltage and 41 the voltage drop in the resistor 28. This voltage drop is in phase with the current in the resistor which, in turn, is in phase with the current in the phase conductor 14, and 42 represents the resultant voltage applied to the coil of the overvoltage relay 20.

From the vector diagrams, it is readily seen that the resultant voltage applied to the coil of any particular overvoltage relay 20 is greatest when its associated generator 11 is carrying the greatest lagging load. With an overvoltage condition in the system due to voltage regulator failure or other causes the buses 21 and 22 are energized. The excitation in the faulty generator is increased. The resultant voltage applied to the associated overvoltage relay 20 will be as shown by the vector 42 in Fig. 4, since the voltage drop reflected in the resistor 28 associated with this generator will have a greater reactive component or voltage drop 44. The excitation is less in the other generators than in the faulty generator so that they will deliver a leading circulating current. The reactive voltage drop 43 in the other generators will be opposite in phase, and therefore the resultant voltage 45 applied to the coils of overvoltage relays 20 will be less in the other generators. The overexcited generator will first be disconnected from the system because of the differences between the voltages applied to the inverse time relays 20.

The operation of my invention may be set forth as follows: In the event of voltage regulator failure with any generator 11 the voltage of the common circuit 15, 16 and 17 of the system will then be increased. The coil of the overvoltage relay 23 is then energized to close its contacts 29, 30 and thereby to energize the buses 21 and 22 and the operating coils of the overvoltage relays 20 associated with their respective generators 11. The generator 11 with which there was voltage regulator failure will then cause a circulating current to flow between the generators, due to its increased excitation and will furnish magnetizing current to the other generators. This increase in excitation will cause it to deliver a lagging current and the voltage drop through the resistor 28 will be displaced in phase in the generator 11 in which voltage regulator failure occurred with a greater resultant voltage applied to its overvoltage relay 20 which will be operated first to close its contacts 31 and 32 and thus to energize the circuit of the trip coil 19 and thereby open the circuit breaker 18. This will then relieve the overvoltage condition on the system.

In the modification of my invention shown in Fig. 2 there are a plurality of single phase generators 11' connected by conductors 12 and 13 through circuit interrupting means 18 to the single phase common circuit 16' and 17'. A reactor 28' is connected in parallel with the current transformer 27, in place of the resistor 28 associated with each generator 11. The coil of the overvoltage relay 20 is energized by the resultant of the apparent voltage of the generator and the voltage across the reactor 28'. With unity power factor load the voltage drop across the reactor 28' will lead the bus voltage by approximately 90 degrees so that the resultant voltage applied to the coil of the overvoltage relay 20 will be similar to that shown in the vector diagram of Fig. 3. With a lagging load the voltage drop in the reactor 28' will still lead the current in the current transformer 27 approximately 90 degrees. With this condition a vector diagram similar to Fig. 4 is obtained, 41 being the voltage produced by the reactor 28' instead of the voltage produced by the resistor 28 as in the three phase system. Therefore the generator with the greatest lagging load will be disconnected from the system.

The operation of this modification of my invention is the same as in the three phase system of distribution explained above.

The above explanations were given with a unity power factor load on the system. When there is a lagging load on the system and the excitation of one particular generator increases, the same result will be obtained with the exception that there is a relative phase displacement of the currents in the generators with respect to the lagging load current since the wattless or reactive current in each generator is superimposed upon the current which it contributes to the external load circuit.

It will be seen that I have thus provided a relatively simple means that is particularly adapted for automatically and selectively relieving an overvoltage condition where there are a plurality of generators delivering energy to a common distribution system.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States is:

1. In an electric generating system, a plurality of three-phase generators, a three-phase circuit, means for connecting said generators to said circuit and means for selectively effecting the opening of the connecting means of a generator causing an overvoltage on the system including means connected to be energized in accordance with the voltage across two phase conductors of said circuit, means associated with each generator and responsive to a condition of the current delivered thereby in the third phase conductor of said circuit and means controlled by said voltage energized means and actuated by the combined effect of said current responsive means and the voltage of the circuit.

2. In an electric generating system, a circuit, a plurality of generators connected thereto, and means for selectively disconnecting from said circuit a generator causing an overvoltage on the system including an impedance device associated with each generator and energized in accordance with the current delivered thereby and an overvoltage relay for each generator connected to be energized in accordance with the resultant of the voltage across said impedance device and a voltage of the circuit.

3. In an electric generating system, a circuit, a plurality of generators connected thereto, and means for selectively disconnecting from said circuit a generator causing an overvoltage on the system including a primary overvoltage relay responsive to a voltage of said circuit, an impedance device associated with each generator and connected to be energized in accordance with the current delivered thereby and an overvoltage relay for each generator controlled by said primary overvoltage relay and connected to be energized in accordance with the sum of the voltage across said impedance device and a voltage of the circuit.

4. In an electric generating system, a three-phase circuit, a plurality of three-phase generators connected thereto, and means for selectively effecting the disconnection from said circuit of a generator causing an overvoltage on the system including a primary overvoltage relay connected to be energized in accordance with the voltage across two-phase conductors of the circuit, an impedance device associated with each generator and connected to be energized in accordance with the current delivered thereby in the third phase conductor of said circuit and an overvoltage relay for each generator controlled by said primary overvoltage relay and connected to be energized in accordance with the sum of the voltage produced in said impedance device and a voltage of the circuit.

5. A protective arrangement for a plurality of generators, a circuit, a switch for connecting each generator to said circuit and means for selectively opening said switches including a plurality of inverse time element overvoltage relays respectively associated with said generators, a primary overvoltage relay, an impedance device associated with each generator and connected to be energized in accordance with the current delivered thereby, said time limit overvoltage relays associated with each generator having an actuating winding connected to be energized in accordance with the sum of a voltage of the circuit and the voltage across said impedance device.

6. In an electric system, a circuit, a plurality of power generating devices connected thereto and means controlled by an electrical condition of the circuit and an electrical condition of the generating devices for selectively disconnecting from the circuit a generating device causing an overvoltage on the system.

7. In an electric system, a circuit, a plurality of power generating devices connected thereto and means for selectively disconnecting from the circuit a generating device causing an overvoltage on the system including means responsive to a voltage of the circuit, means associated with each generating device and responsive to a condition of the current delivered thereby and means controlled by said voltage responsive means and actuated by the combined effect of said current responsive means and the voltage of the circuit.

8. In combination, a circuit, a plurality of power generating devices connected thereto and means for selectively disconnecting from the circuit a generatitng device causing an overvoltage on the circuit including means associated with each device for producing a voltage dependent on the current flowing therein and means connected to be energized in accordance with a resultant of a voltage of the circuit and the voltage produced by said voltage producing means.

9. In combination, a circuit, a plurality of generators connected thereto and means for selectively disconnecting from the circuit a generator causing an overvoltage on the system including means responsive to a voltage of the circuit, means associated with each generator for producing a voltage on the current delivered thereby and means connected to be energized in accordance with the sum of a voltage of the circuit and the voltage produced by said voltage producing means.

10. In combination, a circuit, a plurality of power generating devices connected thereto and means for selectively disconnecting from the circuit a generating device causing an overvoltage on the system including a plurality of relays respectively associated with said devices each of said relays being connected to be energized in accordance with a resultant of a voltage of the circuit and the current flowing in the device.

11. In combination, a circuit, a plurality of power generating devices connected thereto and means for selectively disconnecting from the circuit a generating device causing an overvoltage on the circuit including a plurality of inverse time element relays respectively associated with said devices each of said relays being connected to be energized in accordance with a resultant of a voltage of the circuit and the current flowing in the device.

HAROLD T. SEELEY.